3,520,908
NOVEL PROCESS FOR THE PREPARATION OF
17α-ALKYL STEROIDS
Colin Leslie Hewett, Robert Thomas Logan, and Gilbert
Frederick Woods, Glasgow, Scotland, assignors to
Organon Inc., West Orange, N.J., a corporation of
New Jersey
No Drawing. Continuation-in-part of application Ser. No.
509,625, Nov. 24, 1965. This application Oct. 26, 1967,
Ser. No. 678,175
Claims priority, application Great Britain, Dec. 1, 1964,
48,750/64
Int. Cl. C07c 169/32
U.S. Cl. 260—397.45                    5 Claims

ABSTRACT OF THE DISCLOSURE

A novel process for the introduction of a 17α-alkyl substituent into a 20-keto-steroid of the pregnane series involves reacting a $\Delta^{17(20)}$-20-Grignard enolate of a 20-keto-steroid of the pregnane series with a compound R—X, where R is a saturated aliphatic hydrocarbon group, and X is a halogen, in an aprotic solvent with a low dielectric constant. Among new compounds which are prepared by this reaction are 11β-hydroxy-16,17-dialkyl-steroids of the corticoid and progesterone types, which exhibit high anti-inflammatory activity with only low thymolytic effects.

CROSS-REFERENCE TO RELATED APPLICATION

This application is a continuation-in-part of application Ser. No. 509,625, filed Nov. 24, 1965 now abandoned.

BACKGROUND OF THE INVENTION

This invention relates to a process for the preparation of 17-alkylated steroids, and to a group of novel steroid compounds.

It is known that $\Delta^{16}$-20-keto-pregnanes can be converted into the corresponding 17α-alkyl-20-keto-pregnanes by reduction with an alkali metal, for example lithium, and liquid ammonia followed by treatment with an alkylating agent, for examples an alkyl halide. This so-called reductive alkylation is described in inter alia J. Am. Chem. Soc. 1961, 83, p. 2965. It is probable that this reaction proceeds via the alkali metal enolate, for example the lithium enolate, for example the lithium enolate. An analogous reductive alkylation can be performed starting from a 17α-bromo or 17α-hydroxy-20-keto-pregnane.

Surprisingly it has now been found that 17-alkylation can also be carried out on an enolate salt of a 20-keto-steroid, prepared for example by reacting a $\Delta^{16}$-20-ketone or a $\Delta^{17(20)}$-enol ester, such as the acetate, with Grignard reagent, by reacting it with an alkyl halide, preferably the iodide or bromide.

In addition to being novel this process has important advantages over existing reductive alkylation methods in that higher yields, usually 50–70%, are obtained. It is also now possible to prepare a novel group of 16α,17α-dialkyl steroids which cannot readily be prepared by reductive alkylation.

SUMMARY OF THE INVENTION

The novel process which constitutes one aspect of the invention may be represented by the following reaction schemes:

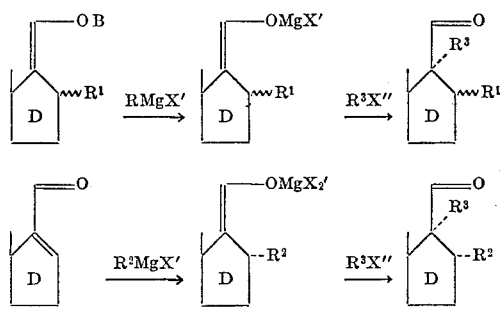

in which

B = an acyl group;
R = an alkyl, aryl or aralkyl group;
$R^1$ = H or a lower alkyl group preferably having from 1–4 carbon atoms;
$R^2$ = a lower alkyl group preferably having from 1–4 carbon atoms;
$R_3$ = a lower alkyl group preferably having 1–4 carbon atoms, and
X' and X" = a halogen atom, for example bromine or iodine.

The process according to this invention is preferably carried out by reacting either the $\Delta^{17(20)}$-enol ester, for example the acetate, or the $\Delta^{16}$-20-keto-steroid with a Grignard reagent and treating the resulting $\Delta^{17(20)}$-enolate salt with an excess of an alkyl halide, usually at least four mole equivalents, and isolating the 17α-substituted steroid by decomposing the Grignard complex in the usual manner. It is known, that, in order to favor formation of the required enolate salt from a $\Delta^{16}$-20-keto-steroid, the reaction with Grignard reagent is preferably carried out in the presence of a suitable copper salt.

Examples of halogen compounds which may be used for the alkylation reaction include halogen derivatives of methane, ethane, propane, isopropane and butane.

The solvent used for this reaction is preferably an aprotic solvent with a low dielectric constant such as tetrahydrofuran, dioxane, an aliphatic ether, hydrocarbons such as benzene and toluene, or the alkyl halide used for the alkylation reaction.

In accordance with a second aspect of the invention, there are provided novel 17-alkyl compounds of the pregnane series which are biologically active and possess progestational and cortical activity. These compounds are 11β-hydroxy-16,17-dialkyl-steroids of the corticoid and progesterone type having the formula:

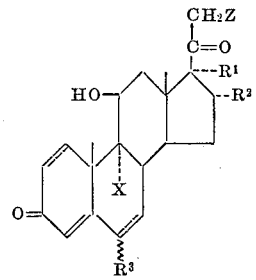

in which $R^1$ = a saturated alkyl group preferably having 1-4 carbon atoms;
$R^2$ = hydrogen or a saturated alkyl group preferably having 1-4 carbon atoms;
$R^3$ = hydrogen a methyl group or a halogen atom;
X = a hydrogen or fluorine atom;
Z = H, OH or OAcyl; and
$C_1$–$C_2$ and $C_6$–$C_7$ may be saturated or unsaturated.

The acyl radical in 21-position of the above formula is that of an aliphatic, cycloaliphatic, aromatic or heterocyclic carboxylic acid, such as for example of formic acid, acetic acid, propionic acid, butyric acid, valeric acid, pivalic acid, t.butyl acetic acid, caproic acid, oenanthic acid, caprylic acid, capric acid, lauric acid, palmitic acid, stearic acid, cyclopropylcarboxylic acid, cyclohexylcarboxylic acid, cyclopentylpropionic acid, phenylacetic acid, succinic acid, glutaric acid and tetrahydrophthalic acid, or inorganic acids such as for example phosphoric acid and sulphuric acid.

The novel 11β-hydroxy-steroids of the invention possess strong anti-inflammatory activity. This circumstance is the more surprising since the corresponding 11-keto- and 11α-hydroxy compounds are practically inactive in this respect. A great advantage of the compounds of the invention is that their high anti-inflammatory activity is coupled with only low thymolytic effects, which provides a surprising and advantageous combination.

The above compounds are useful in the treatment of inflammatory conditions and allergic reactions. Administration can take place orally in the form of tablets, pills or capsules, parenterally in liquid form or topically in the form of ointments, creams or lotions, possibly in combination with other active ingredients.

Another object of this invention provides novel $\Delta^{9(11)}$-steroids having the following formula:

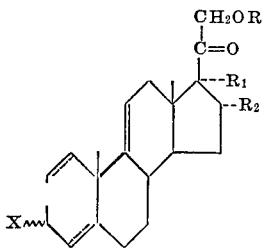

in which

X = OH, OAcyl or a keto group,
R = hydrogen or a lower aliphatic carboxylic acid radical,
$R_1$ = a saturated alkyl group having 1-4 carbon atoms,
$R_2$ = hydrogen or a saturated alkyl group having 1-4 carbon atoms, and
$C_1$–$C_2$ and $C_4$–$C_5$ may be saturated or unsaturated.

These compounds have utility as intermediates in the preparation of the corresponding 11β-hydroxy-9α-fluoro-steroids.

The novel compounds described above may be obtained from 20-keto-$\Delta^{16}$-pregnene derivatives or 20-keto-pregnane derivatives, in which the 16α-position may be substituted by an alkyl group and may contain other double bonds, for example the $\Delta^5$ double bond, or hydroxyl or acyloxy groups, for example, in position 3 and/or 11, or a free protected keto group, for example an 11-keto group or a 3-alkylidene dioxy group, by introducing the 17α-alkyl substituent according to the process of the present invention. The 17α-alkyl and 16α,17α-dialkyl derivatives of the 20-keto pregnane thus obtained may be reacted further, for example, acyloxy groups may be hydrolyzed, hydroxyl groups may be oxidized by methods known per se and additional double bonds may be introduced in a manner known per se.

The process of the present invention for the preparation of these compounds has a great advantage over other methods of alkylating at position 17 in that it is now possible to obtain a 16α,17α-dialkyl 20-keto-pregnane compound. The existing method of preparing 16,17-disubstituted 20-keto-compounds by reductive alkylation of a $\Delta^{16}$-16-alkyl-20-keto-pregnane leads to the therapeutically less important 16β,17α-di-alkyl compounds.

DESCRIPTION OF THE PREFERRED EMBODIMENTS

The invention is further illustrated by the following examples, which are not, however, to be regarded as limiting:

Example 1

A solution of pregna-5,17(20)-diene 3β,20-diol di-acetate (7.5 g.) in ether was added to a stirred solution of methyl magnesium bromide (2 molar) in ether (100 cc.). Solid began to precipitate half-way through the addition and stirring was continued for five hours and then the reaction was allowed to stand at 20° C. for sixteen hours. The ether was then distilled off and replaced at an equal rate with tetrahydrofuran until the boiling point had been reached at 62° C. and the solution was complete. The cooled stirred solution was carefully treated with methyl iodide (37.5 cc.) which caused some solid to precipitate and the reaction was allowed to stand at 18–20° C. with occasional stirring for twelve days. The mixture was then poured into 10% ammonium chloride solution and extracted with ether. The extract was washed with dilute hydrochloric acid, water, sodium bisulphite and water to neutrality, dried and evaporated to dryness. The gummy product was acetylated in pyridine/acetic anhydride overnight at 20° C. and the mixture of acetates isolated via ether. The crude acetate was chromatographed on silica gel and elution with 1% ether in benzene gave a product which crystallized from methanol/methylene chloride to give 17α-methyl pregn-5-en-3β-ol-20-one acetate (4.8 g.). Hydrolysis of the acetate by refluxing with methanolic potassium carbonate for thirty minutes gave 17α-methyl pregna-5-en-3β-ol-20-one (4.3 g.).

1.2 g. of his compound was dissolved in dry toluene (20 cc.) and cyclohexanone (6 cc.) and the solution distilled until free from water. A solution of aluminum isopropoxide (0.66 g.) in dry toluene was added to the hot solution, which was then refluxed for thirty minutes and slowly distilled for ten minutes. The cooled solution was treated with an aqueous solution of Rochelle salt (2.5 g.) and steam distilled until no more steam volatile products distilled. The solid residue was filtered, dissolved in ether and the ether solution dried over sodium sulphate. The dried solution was run through a short column of alumina and the product crystallized from ether/hexane to give 17α-methyl-progesterone (850 mg.).

Example 2

Pregn-5,17(20)-diene-3β,20-diol diacetate (20 g.) in ether was added to a stirred solution of methyl magnesium iodide (2 molar) in ether (100 cc.). Some solid precipitated during the addition and stirring was continued for five hours after which the reaction was allowed to stand at 20° C. for fifteen hours. The ether was then gradually distilled and replaced with tetrahydrofuran, keeping the volume almost constant, until the solution was complete, by which time the boiling point had been reached, i.e., 62° C. The cooled stirred solution was treated carefully with ethyl iodide (50 cc.) and after stirring for two hours the reaction was allowed to stand at 18–20° C. for ten days. The mixture was then poured on to 10% ammonium chloride solution, the product extracted with ether, and the extract washed with dilute hydrochloric acid, water, sodium bisulphite solution and then with water to neutrality. The dried extract was evaporated to give a gum which was acetylated overnight in pyridine/acetic anhydride at 20° C. and the acetate isolated via ether. The product was chromatographed on silica gel and elution with 1% ether in benzene gave a solid which crystallized from methanol to give 17α-ethyl pregn-5-en-3β-ol-20-one acetate (5.9 g.).

In accordance with the method described in the previous example this compound has been converted into 17α-ethyl-progesterone.

In an analogous manner there has been prepared 6α,17α-dimethyl-progesterone, 17α-propyl-desoxycorticosterone acetate and 17α-methyl-11β-hydroxy-progesterone.

Example 3

A solution of the magnesium $\Delta^{17(20)}$-enolate salt of 16α-methyl pregn-5-en-3β-ol-20-one, prepared by treating pregn-5,16-dien-3β-ol-20-one (32 g.) with a solution of methyl magnesium bromide (0.96 molar) in tetrahydrofuran (900 cc.) in a nitrogen atmosphere in the presence of cuprous bromide (2.5 g.), was treated carefully with methyl iodide (200 cc.) with cooling and after stirring at room temperature for five hours the reaction was allowed to stand for five days. The product was isolated by decomposing the Grignard complex in 10% ammonium chloride solution and then extracting with either. The washed and dried extract was evaporated and the product crystallized from methanol to give 16α-17α-dimethyl pregn-5-en-3β-ol-20-one (17 g.), which has been converted into 16α,17α-dimethyl-progesterone according to the method as described in Example 1.

In an analogous manner there has been prepared 16α-ethyl-17α-methyl-progesterone, 16α-butyl-17α-methyl-progesterone, 16α-butyl-17α-methyl-progesterone, 16α-methyl-17α-ethyl-progesterone, 6α,16α,17α-trimethyl-progesterone, 6α-methyl-16α-ethyl-17α-methyl-progesterone, 7α,16α,17α-trimethyl-progesterone and 7α,16α-dimethyl-16α-ethyl progesterone.

Example 4

A stirred solution of methyl magnesium bromide in THF (56 cc.; 0.95 M) was cooled to 5–7° C. and treated with a suspension of cupric acetate (400 mg.) in THF in an atmosphere of nitrogen and after 15 minutes a solution of pregna-5,16-diene-3β,21-diol-20-one diacetate (5 g.) in THF was added slowly keeping the temperature of the reaction below 10° C.

Stirring was continued and after 1.5 hours, the cooling bath was removed and the solution allowed to warm to room temperature for a further 1.5 hours. The solution was again cooled to 7° C. and methyl iodide (100 cc.) was added cautiously at first keeping the temperature below 10° C. When addition of the methyl iodide was complete the solution was allowed to warm to room temperature and then it was heated under reflux for 3 days. The solution was then distilled to remove the methyl iodide, until the boiling point reached 63° C. and the cooled residue was poured into an ice cold solution (300 cc.) of ammonium chloride (10 g.) and sodium thiosulphate (2.5 g.). The product was extracted with ether and the extract washed with 5% ammonium chloride solution, water, 2 N HCl, and then with water to neutrality. The dried extract was acetylated overnight with pyridine/acetic anhydride at room temperature and the acetylated product isolated via ether. The dried extract was diluted with hexane and after the ether had been removed by distillation the residual hexane solution was passed through a short column of alumina. The combined eluate and washings were evaporated to a low bulk to give a crude product (3.6 g.) which was crystallized from methanol to give 16α,17α-dimethyl pregn-5-ene-3β,21-diol-20-one diacetate (2.4 g.).

The corresponding free 3β,21-diol was converted into 16α,17α-dimethyl-desoxycorticosterone by Oppenauer oxidations; subsequent treatment with acetic anhydride and pyridine gave the corresponding 21-acetate.

In a similar manner 16α-ethyl-17α-methyl-desoxycorticosterone; 16α-propyl-17α-ethyl-desoxycorticosterone; 6α,16α-dimethyl-17α-ethyl-desoxycorticosterone; 6α,16α,17α-trimethyl-desoxycorticosterone; 16α,17α-dimethyl-corticosterone; 6α,16α,17α-trimethyl-corticosterone and their 21-acetates have been prepared.

Example 5

A stirred solution of 0.9 M methyl magnesium bromide (250 cc.) in tetrahydrofuran was treated in an atmosphere of nitrogen with a solution of cuprous bromide (2.64 g.) in dry tetrahydrofuran, and a solution of 3β,11α-dihydroxy-$\Delta^{16}$-5α-pregnane-20-one diacetate (15 g.) in tetrahydrofuran was added over about 15 minutes keeping the temperature at 20–25° C. with water cooling. The mixture was stirred at 20° C. for 6 hours by which time reaction was complete (no U.V. absorption at 240 m.). Methyl iodide (150 cc.) twice distilled over $P_2O_5$ was then added cautiously with cooling and after the addition was complete the stirred mixture was heated under reflux for 24 hours with rigorous exclusion of moisture. The mixture was evaporated almost to dryness under reduced pressure to remove methyl iodide and the brown residue was treated with 1 liter of a solution containing 5% ammonium chloride and 2½% sodium thiosulphate. The solid was filtered and washed with dilute HCl and water and dissolved in methylene chloride. The dried extract was filtered through a short column of alumina and washed through with more methylene chloride. The combined eluates were evaporated to dryness and the product was acetylated in pyridine (60 cc.) and acetic anhydride (30 cc.) overnight at 20° C. The crude diacetate was crystallized from methanol to give 3β,11α-dihydroxy-16α,17α-dimethyl-5α-pregnan-20-one diacetate (11 g.).

In a similar manner a series of $\Delta^{16}$-20-oxo-pregnenes were reacted to give the corresponding 16α,17α-dimethyl derivatives. The following are given as examples and are not to be construed as limiting:

3α,11β-dihydroxy-$\Delta^{16}$-5β-pregnen-20-one 3-acetate to give 3α,11β-dihydroxy-16α,17α-dimethyl-5β-pregnan-20-one 3-acetate; 3β,12β-dihydroxy-$\Delta^{16}$-5α-pregnen-20-one diacetate to give 3β,12β-dihydroxy-16α,17α-dimethyl-5α-pregnane-20-one diacetate; 3β-hydroxy-$\Delta^{16}$-5α-pregnene-11,20-dione acetate to give 3β-hydroxy-16α,17α-dimethyl-5α-pregnane-11,20-dione acetate; 3α-hydroxy-$\Delta^{16}$-5β-pregnene-11,20-dione acetate to give 3α-hydroxy-16α,17α-dimethyl-5β-pregnane-11,20-dione acetate; 3β,5α-dihydroxy 6β-methyl-$\Delta^{16}$-5α-pregnene-20-one 3-acetate to give 3β,5α-dihydroxy-6β,16α,17α-trimethyl-5α-pregnane-20-one 3-acetate; 3β-hydroxy-$\Delta^{9(11),16}$-5α-pregnadien-20-one acetate to give 3β-hydroxy-16α,17α-dimethyl-$\Delta^{9(11)}$-5α-pregnene-20-one acetate; 3α-hydroxy-$\Delta^{9(11),16}$-5β-pregnadien-20-one acetate to give 3α-hydroxy-16α,17α-dimethyl-$\Delta^{9(11)}$-5β-pregnan-20-one acetate; 3β-hydroxy-$\Delta^{5,16}$-pregnadien-20-one acetate to give 3β-hydroxy-16α,17α-dimethyl-$\Delta^5$-pregnen-20-one acetate; 3β,11β-dihydroxy-$\Delta^{5,16}$-pregnadien-20-one acetate (prepared by known methods from 11-keto tigogenin) to give 3β,11β-dihydroxy-16α,17α-dimethyl-$\Delta^5$-pregnen-20-one acetate.

Example 6

3β,11α-dihydroxy-$\Delta^{16}$-5α-pregnene-20-one diacetate (4 g.) was reacted exactly as described in Example 1 except that after the initial reaction with methyl magnesium bromide, dry distilled ethyl iodide instead of methyl iodide was used for the second part of the reaction. The crude acetylated product was fractionally crystallized from methanol to give 3β-11α-dihydroxy-16α-methyl-17α-ethyl-5α-pregnan-20-one diacetate (1.75 g.).

In a similar manner the following compounds were prepared:

3β-hydroxy-16α-methyl-17α-ethyl-$\Delta^5$-pregnene-20-one acetate.

3α,11β - dihydroxy - 16α - methyl - 17α - ethyl - 5β-pregnan-20-one 3-acetate.

3β,12β - dihydroxy - 16α - methyl - 17α - ethyl - 5α-pregnane-20-one diacetate.

3β - hydroxy - 16α - methyl - 17α - ethyl - 5 - pregnane-11,20-dione acetate.

3α - hydroxy - 16α - methyl - 17α - ethyl - 5β - pregnane-11,20-dione acetate.

3β,5α - dihydroxy - 6β,16α - dimethyl - 17α - ethyl - 5α-pregnan-20-one 3-acetate.

3β - hydroxy - 16α - methyl - 17α - ethyl - Δ$^{9(11)}$ - 5α-pregnene-20-one acetate.

3α - hydroxy - 16α - methyl - 17α - ethyl - Δ$^{9(11)}$ - 5β-pregnene-20-one acetate.

Example 7

3β,11α - dihydroxy - Δ$^{16}$ - 5α - pregnene - 20 - one (10 g.) in dry tetrahydrofuran was added in an atmosphere of nitrogen over 15 minutes to a stirred solution of 0.8 N ethyl magnesium bromide (150 cc.) in dry tetrahydrofuran to which has been added a solution of cuprous bromide (1.58 g.) in tetrahydrofuran, keeping the temperature below 25° C. with water cooling. The mixture was stirred for 16 hours at 20° C. by which time no Δ$^{16}$-20-ketone remained in the solution (U.V. absorption of a sample). Methyl iodide (150 cc.) twice distilled over P$_2$O$_5$ was then added cautiously with cooling and the stirred mixture was heated under reflux for 40 hours with rigorous exclusion of moisture. The mixture was then evaporated almost to dryness under reduced pressure to remove the methyl iodide and the residue was treated with 700 cc. of a solution containing 5% ammonium chloride and 2½% sodium thiosulphate. The solid was filtered, washed with dilute HCl and water, dissolved in methylene chloride and the dried extract was filtered through a short column of alumina. The eluate and methylene chloride washings were combined and evaporated to dryness and the residue was acetylated overnight at room temperature in pyridine (400 cc.) and acetic anhydride (20 cc.). The crude diacetate was fractionally crystallized from methanol and acetone/hexane to give 3β,11α-dihydroxy-16α - ethyl - 17α - methyl - 5α - pregnan - 20 - one diacetate (6.2 g.).

The following compounds were prepared in a similar manner:

3β - hydroxy - 16α - ethyl - 17α - methyl - Δ$^5$ - pregnene-20-one acetate.

3β - hydroxy - 16α - ethyl - 17α - methyl - 5α - pregnane-11,20-dione acetate.

3α - hydroxy - 16α - ethyl - 17α - methyl - 5β - pregnane-11,20-dione acetate.

3α,11β - dihydroxy - 16α - ethyl - 17α - methyl - 5β-pregnan-20-one 3-acetate.

3β,12β - dihydroxy - 16α - ethyl - 17α - methyl - 5α-pregnan-20-one diacetate.

3α - hydroxy - 16α - ethyl - 17α - methyl - Δ$^{9(11)}$ - 5β-pregnene-20-one acetate.

3β - hydroxy - 16α - ethyl - 17α - methyl - Δ$^{9(11)}$ - 5α-pregnene-20-one acetate.

3β,5α - dihydroxy - 6β,17α - dimethyl - 16α - ethyl - 5α-pregnane-20-one 3-acetate.

Example 8

A hot solution of 3β,11α-dihydroxy-16α,17α-dimethyl-5α-pregnane-20-one diacetate (20 g.) in methanol (100 cc.) was treated under nitrogen with a solution of potassium hydroxide (20 g.) in water (9 cc.) and methanol (100 cc.), and the mixture was heated under reflux for 2 hours. The solution was cooled and treated with acetic acid (20 cc.) and water (200 cc.) and the solid was filtered and washed with aqueous methanol and water to give 3β,11α - dihydroxy - 16α,17α-dimethyl-5α-pregnan-20-one (15.8 g.).

The corresponding diacetates were hydrolyzed in a similar manner to give the following compounds:

3β,11α-dihydroxy-16α-methyl-17α-ethyl-5α-pregnan-20-one

3β,11α-dihydroxy-16α-ethyl-17α-methyl-5α-pregnan-20-one

Example 9

A stirred suspension of 3β,11α-dihydroxy-16α,17α-dimethyl-5α-pregnan-20-one (15 g.) in methanol (190 cc.) at 30° C. was treated with 4 N methanolic HBr (3.65 cc.) and then dropwise with bromine (2.25 cc.) over 2–3 hours at such a rate that the solution did not color up. After approximately 2 hours, solution was complete and stirring was continued for 15 minutes after complete addition of the bromine. 10% aqueous sodium sulphite (5.75 cc.) was added to remove traces of bromide (—ve test with starch/KI paper) and a solution on 10% aqueous sodium acetate (75 cc.) followed by water (750 cc.) was added solwly with stirring, and a solid seed of the product was added. After standing for 18 hours the product was filtered, washed with water and dried in vacuo at a low temperature to give 3β,11α-dihydroxy-16α,17α-dimethyl-21-bromo-5α-pregnan-20-one (18.6 g.).

In a similar manner the following 16α,17α-dialkyl-21-bromo compounds were prepared:

3α,11β - dihydroxy - 16α,17α - dimethyl - 21 - bromo - 5β-pregnane-20-one.

3β,11β - dihydroxy-16α,17α-dimethyl - 21 - bromo-5α-pregnan-20-one.

3α,11β - dihydroxy - 9α - fluoro - 16α,17α - dimethyl - 21-bromo-5β-pregnan-20-one.

3β,11β - dihydroxy - 9α - fluoro - 16α,17α - dimethyl - 21-bromo-5α-pregnan-20-one.

3β,11α - dihydroxy - 16α - methyl - 17α - ethyl - 21 - bromo-5α-pregnan-20-one.

3β,11α - dihydroxy - 16α - ethyl - 17α - methyl - 21 - bromo-5α-pregnan-20-one.

3β,5α,11β - trihydroxy - 6β - fluoro - 16α,17α - dimethyl-21-bromo-5α-pregnan-20-one.

3β,5α,11β - trihydroxy - 6β,16α,17α - trimethyl - 21 - bromo-5α-pregnan-20-one.

Example 10

3β,11α - dihydroxy - 16α,17α - dimethyl - 21 - bromo - 5α-pregnan-20-one (30 g.) was dissolved in a filtered solution of silver acetate (17.4 g.) in pyridine (160 cc.) and allowed to stand at 20° C. for 64 hours. The solution was poured into ice made 2 N with respect to hydrochloric acid and the solid product filtered and extracted several times with ethyl acetate. The washed and dried extract was evaporated to dryness to give the crude product (32 g.) which was purified by dissolving it in acetone, treating the solution with animal charcoal and filtering through a column of alumina. Evaporation of the eluate and washing gave 3β,11α,21-trihydroxy-16α,17α-dimethyl-5α-pregnan-20-one 21-acetate (27 g.).

In a similar manner the following 21-acetoxy compounds were prepared:

3α,11β,21 - trihydroxy - 16α - dimethyl - 5β - pregnan - 20-one 21-acetate.

3β,11β,21 - trihydroxy - 16α,17α - dimethyl - 5α - pregnan-20-one 21-acetate.

3β,12β,21 - trihydroxy - 16α,17α - dimethyl - 5α - pregnan-20-one 21-acetate.

3α,11β,21 - trihydroxy - 16α,17α - dimethyl - 5β - pregnan-20-one 21-acetate.

3β,11α,21 - trihydroxy - 16α - methyl - 17α - ethyl - 5α-pregnan-20-one 21-acetate.

3β,11α,21 - trihydroxy - 16α - ethyl - 17α - methyl - 5α-pregnan-20-one 21-acetate.

3β,21 - dihydroxy - 16α,17α - dimethyl - Δ$^{9(11)}$ - 5α - pregnan-20-one 21-acetate.

3α,21 - dihydroxy - 16α,17α - dimethyl - Δ⁹⁽¹¹⁾ - 5β - pregnan-20-one 21-acetate.

3α,11β,21 - trihydroxy - 16α - methyl - 17α - ethyl - 5β-pregnan-20-one 21-acetate.

3β,11β,21 - trihydroxy - 16α - methyl - 17α - ethyl - 5α-pregnan-20-one 21-acetate.

3β,11β,21 - trihydroxy - 16α - ethyl - 17α - methyl - 5α-pregnan-20-one 21-acetate.

3α,11β,21 - trihydroxy - 16α - ethyl - 17α - methyl - 5β-pregnan-20-one 21-acetate.

3β,5α,11β,21 - tetrahydroxy - 6β - fluoro - 16α,17α - dimethyl-5α-pregnan-20-one 21-acetate.

3β,5α,11β,21 - tetrahydroxy - 6β,16α,17α - trimethyl - 5α-pregnan-20-one 21-acetate.

3α,21 - dihydroxy - 16α - ethyl - 17α - methyl - Δ⁹⁽¹¹⁾ - 5β-pregnan-20-one 21-acetate.

3α,21 - dihydroxy - 16α - methyl - 17α - ethyl - Δ⁹⁽¹¹⁾ - 5β-pregnan-20-one 21-acetate.

Example 11

A stirred solution of 3β,11α,21-trihydroxy-16α,17α-dimethyl-5α-pregnan-20-one 21-acetate (10 g.) in t-butanol (162 cc.) and pyridine (9.5 cc.) at 45° C. was treated under nitrogen with N-bromo-succinimide (7.1 g.) and after 2 hours more N-bromo-succinimide (2.4 g.) was added and stirring continued for another hour. The stirred mixture was cooled to 20° C. and treated with acetic acid (47.5 cc.) and zinc (12.9 g.) which was added slowly keeping the temperature below 25° C. Charcoal (0.7 g.) was then added and the mixture was stirred overnight at 25° C. The filtered solution was concentrated to 100 cc. under reduced pressure and added at 5° C. to 400 cc. of ice water containing concentrated sulphuric acid (4 cc.). The solid was filtered, washed and dried to give 11α,21 - dihydroxy - 16α,17α - dimethyl - 5α - pregnane - 3,20-dione 21-acetate (8.2 g.).

The following 3-oxo compounds were prepared in a similar manner:

11α-hydroxy-16α,17α-dimethyl-5α-pregnane-3,20-dione.
11β-hydroxy-16α,17α,dimethyl-5β-pregnane-3,20-dione.
11α - hydroxy - 16α - methyl - 17α - ethyl - 5α - pregnane-3,20-dione.
11α - hydroxy - 16α - ethyl - 17α - methyl - 5α - pregnane-3,20-dione.
11β,21 - dihydroxy - 16α,17α - dimethyl - 5β - pregnan - 3,20-dione 21-acetate.
12β,21 - dihydroxy - 16α,17α - dimethyl - 5α - pregnan - 3,20-dione 21-acetate.
11β,21 - dihydroxy - 16α,17α - dimethyl - 5α - pregnan - 3,20-dione 21-acetate.
11α,21 - dihydroxy - 16α - methyl - 17α - ethyl - 5α-pregnan-3,20-dione 21-acetate.
11α,21 - dihydroxy - 16α - ethyl - 17α - methyl - 5α-pregnan-3,20-dione 21-acetate.
21 - hydroxy - 16α,17α - dimethyl - Δ⁹⁽¹¹⁾ - 5α - pregnen-3,20-dione acetate.
21 - hydroxy - 16α,17α - dimethyl - Δ⁹⁽¹¹⁾ - 5β - pregnen-3,20-dione acetate.
11β,21 - dihydroxy - 16α - methyl - 17α - ethyl - 5β-pregnan-3,20-dione 21-acetate.
11β,21 - dihydroxy - 16α - methyl - 17α - ethyl - 5α-pregnan-3,20-dione 21-acetate.
11β,21 - dihydroxy - 16α - ethyl - 17α - methyl - 5α-pregnan-3,20-dione 21-acetate.
11β,21 - dihydroxy - 16α - ethyl - 17α - ethyl - 5β-pregnan-3,20-dione 21-acetate.
5α,11β,21 - trihydroxy - 6β,16α,17α - trimethyl - 5α-pregnane-3,20-dione 21-acetate.
5α,11β,21 - trihydroxy - 6β - fluoro-16α,17α-dimethyl-5α-pregnane-3,20-dione 21-acetate.
5α,11β,21 - trihydroxy - 6β - fluoro - 16α,17α - dimethyl-5α-pregnane-3,20-dione 21-acetate.

Example 12

A stirred solution of 11α,21 - dihydroxy - 16α,17α - dimethyl-5α-pregnane-3,20-dione 21-acetate (8.2 g.) in pyridine (16.5 cc.) was cooled in an ice bath and treated over 20 minutes with p-toluene sulphonyl chloride (7.4 g.). The solution was kept at 0–4° C. for 48 hours and then ice water (16.5 cc.) was added at such a rate that the temperature remained below 25° C. The solid was filtered, washed with 30% aqueous pyridine and water and then dried in vacuo at 40° C. The crude product in acetone was purified with animal charcoal and crystallization from aqueous acetone gave 11α,21-dihydroxy-16α,17α-dimethyl - 5α - pregnane - 3,20-dione 11-tosylate-21-acetate (5.7 g.).

The following 11α-tosyloxy compounds were prepared in a similar manner:

11α - hydroxy - 16α,17α - dimethyl - 5α - pregnane-3,20-dione 11-tosylate.
11α,21 - dihydroxy - 16α - methyl - 17α - ethyl - 5α-pregnane-3,20-dione 11-tosylate 21-acetate.
11α,21 - dihydro - 16α - ethyl - 17α - methyl - 5α-pregnane-3,20-dione 11-tosylate 21-acetate.

Example 13

A stirred solution of 11α,21 - dihydroxy - 16α,17α-dimethyl - 5α - pregnane - 3,20 - dione 11α - tosylate 21-acetate (3.73 g.) in methylene chloride (26 cc.) and acetic acid (45.6 cc.) was cooled to 5° C. and treated with a solution of 4 N HBr in acetic acid (3.33 cc.). Bromine (0.69 cc.) in acetic acid (8.3 cc.) was added slowly over approximately 35 minutes at such a rate that the solution remained almost colorless. Stirring was continued for a further 30 minutes at 15° C. by which time no bromine remained (−ve reaction with starch-iodide paper). A solution of sodium acetate (5.2 g.) in water (10 cc.) was added and after 10 minutes stirring the solution which was acid to Congo red was poured into 200 cc. of water and shaken thoroughly. The product was isolated by extraction with methylene chloride and the washed and dried extract was evaporated to dryness under vacuum and the residue was dissolved in dioxan (10 cc.) and poured slowly into stirred ice water (100 cc.). The solid was filtered, washed and dried to give 2ξ,4ξ-dibromo - 11α,21 - dihydroxy - 16α,17α - dimethyl - 5α-pregnane-3,20-dione 11-tosylate 21-acetate (4.9 g.).

In a similar way the following 2,4-dibromo compounds were prepared:

2ξ,4ξ - dibromo - 11α,21 - dihydroxy - 16α - methyl-17α-ethyl-5α-pregnane-3,20-dione 11-tosylate-21-acetate.
2ξ,4ξ - dibromo - 11α,21 - dihydroxy - 16α - ethyl - 17α-methyl-5α-pregnane-3,20-dione 11-tosylate-21-acetate.
2ξ,4ξ - dibromo - 16α,17α - dimethyl - 21 - hydroxy-Δ⁹⁽¹¹⁾-5α-pregnene-3,20-dione acetate.

Example 14

2ξ,4ξ - dibromo - 11α,21 - dihydroxy - 16α,17α - dimethyl - 5α - pregnane - 3,20 - dione 11 - tosylate 21-acetate (4.9 g.) was added to a mixture of lithium bromide (3.5 g.) and dry calcium carbonate (7.0 g.) in dimethyl formamide (300 cc.) and the mixture was stirred at 130–135° C. for 5 hours. It was then concentrated to 200 cc. under vacuum at 75° C. and poured with stirring into ice water (1600 cc.), made acid with hydrochloric acid and allowed to stand overnight. The solid was filtered, washed and dried and the product was extracted from some inorganic material with ether to give on evaporation of the extract 16α,17α - dimethyl - 21 - hydroxy-Δ¹,⁴,⁹,⁽¹¹⁾ - pregnatriene - 3,20 - dione 21-acetate (2.1 g.).

In a similar way the following Δ¹,⁴,⁹⁽¹¹⁾ - trienes were prepared:

21 - hydroxy - 16α - methyl - 17α - ethyl - Δ¹,⁴,⁹,⁽¹¹⁾-pregnatriene-3,20-dione acetate.
21 - hydroxy - 16α - ethyl - 17α - methyl - Δ¹,⁴,⁹,⁽¹¹⁾-pregnatriene-3,20-dione acetate.

Example 15

A stirred solution of 16α,17α - dimethyl - 21 - hydroxy-$\Delta^{1,4,9(11)}$ - pregnatriene - 3,20 - dione 21 - acetate (2.6 g.) in dimethyl formamide (15.2 cc.) was treated dropwise at 10° C. with 70% perchloric acid (0.52 cc.) keeping the temperature below 20° C. N-bromo-succinimide (1.67 g.) was added over 10 minutes with the exclusion of light, and stirring was continued for 4 hours at 30° C. The reaction was cooled to 20°–24° C. and sodium sulphite (0.52 g.) in water (0.5 cc.) added, and the mixture poured into ice water (200 cc.). The solid was filtered, washed and dried under vacuum to give 9α-bromo-11β,21 - dihydroxy - 16α,17α - dimethyl - $\Delta^{1,4}$ - pregnadiene-3,20-dione 11-formate 21-acetate (3.1 g.).

In a similar manner the following 9α-bromo-11β-formyloxy compounds were prepared:

9α - bromo - 11β - hydroxy - 16α,17α - dimethyl - $\Delta^{1,4}$-pregnadiene-3,20-dione 11-formate.

9α - bromo - 11β,21 - dihydroxy - 16α - methyl - 17α-ethyl-$\Delta^{1,4}$-pregnadiene-20-one 11-formate-21-acetate.

9α - bromo - 11β,21 - dihydroxy - 16α - ethyl - 17α-methyl-$\Delta^{1,4}$-pregnadiene-20-one 11-formate-21-acetate.

6α - fluoro - 9α - bromo - 11β,21 - dihydroxy - 16α,17α-dimethyl - $\Delta^{1,4}$ - pregnadiene - 3,20 - dione 11-formate 21-acetate.

6α,16α,17α - trimethyl - 9α - bromo - 11β,21 - dihydroxy - $\Delta^{1,4}$ - pregnadiene - 3,20 - dione 11 - formate 21-acetate.

Example 16

A stirred solution of 9α-bromo-11β,21-dihydroxy-16α,17α - dimethyl - $\Delta^{1,4}$-pregnadiene-3,20-dione 11-formate 21-acetate (3.1 g.) in tetrahydrofuran (25.6 cc.) and methanol (21.4 cc.) at 15° C. was treated under nitrogen with N sodium methoxide in methanol (7.75 cc.). After stirring for 30 minutes at 20° C. the solution was acidified to pH 6 with acetic acid and poured into a mixture of chloroform (20 cc.) and water (30 cc.). The product was isolated via chloroform and crystallized from acetone to give 9β,11β-oxido-16α,17α-dimethyl-21 - hydroxy - $\Delta^{1,4}$-pregnadiene-3,20-dione (1.4 g.). Acetylation in pyridine and acetic anhydride at room temperature gave the 21-acetate.

In a similar manner the following 9β,11β-oxides and their acetates were prepared:

9β,11β - oxido - 16α - methyl-17α-ethyl-21-hydroxy-$\Delta^{1,4}$-pregnadiene-3,20-dione.

9β,11β-oxido-16α-ethyl-17α - methyl - 21 - hydroxy-$\Delta^{1,4}$-pregnadiene-3,20-dione.

9β,11β - oxido-16α,17α-dimethyl-$\Delta^{1,4}$-pregnadiene-3,20-dione.

6α-fluoro - 9β,11β - oxido - 16α,17α-dimethyl-21-hydroxy-$\Delta^{1,4}$-pregnadiene-3,20-done.

6α,16α,17α - trimethyl - 9β,11β - oxido - 21 - hydroxy-$\Delta^{1,4}$-pregnadiene-3,20-dione.

Example 17

A solution of 9β,11β - epoxy-16α,17α-dimethyl-21-hydroxy-$\Delta^{1,4}$-pregnadiene-3,20-dione (2.5 g.) in chloroform (12 cc.) was added to a solution of anhydrous hydrogen fluoride (6.5 g.) in tetrahydrofuran (10 cc.) and chloroform (4.5 cc.) at —25° C. to —35° C. and washed with chloroform (14 cc.). The resulting solution was kept in ice at 0° C. for 4 hours, after which the mixture was slowly added with stirring to a solution of potassium carbonate (25 g.) in ice water and stirring was continued for 15 minutes. 50% acetic acid was added until the aqueous phase was pH 6 and the mixture was then distilled under vacuum to remove the chloroform. The residue was cooled to 5° C. and the solid filtered, washed and dried. The crude product was treated with chloroform (2.5 cc.) by swirling for one hour and then cooled to 10° C. and the solid filtered to give 9α-fluoro-11β,21-dihydroxy-16α,17α-dimethyl-$\Delta^{1,4}$-pregnadiene-3,20-dione (1.8 g.).

In a similar manner the following 9α-fluoro-11β-hydroxy compounds were prepared:

9α - fluoro - 11β - hydroxy - 16α,17α-dimethyl-$\Delta^{1,4}$-pregnadiene-3,20-dione.

9α - fluoro - 11β,21-dihydroxy-16α-methyl-17α-ethyl-$\Delta^{1,4}$-pregnadiene-3,20-dione.

9α-fluoro-11β,21 - dihydroxy - 16α - ethyl-17α-methyl-$\Delta^{1,4}$-pregnadiene-3,20-dione.

6α,9α - difluoro-11β,21 - dihydroxy-16α,17α-dimethyl-$\Delta^{1,4}$-pregnadiene-3,20-dione.

6α,16α,17α - trimethyl-9α-fluoro - 11β,21-dihydroxy-$\Delta^{1,4}$-pregnadiene-3,20-dione.

Example 18

11α,21 - dihydroxy - 16α,17α-dimethyl-5α-pregnane-3,20-dione 11-tosylate 21-acetate (3 g.) was carefully added to stirred collidine (10 cc.) almost at the boil. The solution was heated under reflux for 30 minutes, cooled to <50° and slowly poured into a stirred mixture of ice and hydrochloric acid. After 30 minutes the solid was filtered from the acid solution, washed with 5 N hydrochloric acid, then with warm water to neutrality and dried to give 21 - hydroxy - 16α,17α - dimethyl-$\Delta^{9(11)}$-5α-pregnene-3,20-dione acetate (2.05 g.).

In a similar manner the following $\Delta^{9(11)}$-compounds were prepared:

16α,17α-dimethyl-$\Delta^{9(11)}$-5α-pregnene-3,20-dione.

21 - hydroxy-16α - methyl - 17α-ethyl-$\Delta^{9(11)}$-5α-pregnene-3,20-dione acetate.

21 - hydroxy-16α-ethyl-17α-methyl-$\Delta^{9(11)}$ - 5α - pregnene-3,20-dione acetate.

Example 19

A solution of 21 - hydroxy-16α,17α-dimethyl-$\Delta^{9(11)}$-5α-pregnene-3,20-dione acetate (6 g.) and dichlorodicyanobenzoquinone (9.5 g.) in dioxan (60 cc.) was heated under reflux for 18 hours. The mixture was filtered and the filtrate evaporated to dryness and extracted several times with benzene. The combined benzene extracts were concentrated and passed down a short column of alumina and washed through with benzene. The combined eluates were evaporated to dryness and the residue was crystallized from acetone to give 21-hydroxy-16α,17α-dimethyl-$\Delta^{1,4,9(11)}$-pregnatriene-3,20-dione acetate (2.9 g.).

The following $\Delta^{1,4,9(11)}$-trienes were prepared in a similar manner:

16α,17α-dimethyl-$\Delta^{1,4,9(11)}$-pregnatriene-3,20-dione.

21 - hydroxy-16α-methyl-17α-ethyl-$\Delta^{1,4,9(11)}$-pregnatriene-3,20-dione acetate.

21 - hydroxy-16α-ethyl-17α-methyl-$\Delta^{1,4,9,(11)}$-pregnatriene-3,20-dione acetate.

Example 20

A stirred solution of 3β - hydroxy-16α,17α-dimethyl-$\Delta^5$-pregnene-20-one (10 g.) in tetrahydrofuran (350 cc.) was heated vigorously under reflux with cupric bromide (15.5 g.) for 4 hours. The cooled solution was filtered from cuprous bromide which was washed with a little tetrahydrofuran and the combined filtrate and washings were concentrated at <20° under vacuum and then carefully diluted with water to give a slightly tacky solid which was separated by filtration and washed with water. A solution of the solid in benzene was washed neutral with water, dried and passed through a column of silica gel (40 g.) and washed through with benzene. The combined eluates were evaporated to dryness at 20–25° C. under vacuum and the residue was crystallized from methylene chloride/methanol to give 3β - hydroxy-16α,17α - dimethyl - 21 - bromo-$\Delta^5$-pregnen-20-one (6.5 g.).

The following 21-bromo compounds were prepared in a similar manner:

3β - hydroxy - 16α,17α - dimethyl - 21 - bromo - $\Delta^{9(11)}$-5α-pregnen-20-one.

3α - hydroxy - 16α,17α - dimethyl - 21 - bromo - $\Delta^{9(11)}$-5β-pregnen-20-one.

3α - hydroxy - 16α - ethyl - 17α - methyl - 21 - bromo-
$\Delta^{9(11)}$-5β-pregnen-20-one.

3α - hydroxy - 16α - methyl - 17α - ethyl - 21 - bromo-
$\Delta^{9(11)}$-5β-pregnen-20-one.

Example 21

A stirred solution of 11β,21 - dihydroxy - 16α,17α - dimethyl - 5β - 3,20 - dione 21 - acetate (2.32 g.) in methylene chloride (23 cc.) and acetic acid (42.5 cc.) was cooled to 5° C. and treated with a solution of 4 N HBr in acetic acid (3.33 cc.). Bromine (0.345 cc.) in acetic acid (8.3 cc.) was added slowly over approximately 35 minutes at such a rate that bromine was not allowed to accumulate in the solution. Stirring was continued for a further 30 minutes at 15° C. by which time the solution was bromine free (—ve reaction with starch/KI paper). Sodium acetate (5.2 g.) in water (10 cc.) was added and after stirring for 10 minutes the solution was poured into water (200 cc.) and shaken thoroughly. The product was extracted with methyl chloride and the washed and dried extract was evaporated to dryness under vacuum. The residue was dissolved in dioxan (10 cc.) and slowly poured into stirred ice water (100 cc.) and the solid which formed was filtered, washed and dried to give 4ξ-bromo-11β,21-dihydroxy - 16α,17α - dimethyl - 5β - pregnan - 3,20 - dione 21-acetate (2.6 g.).

In a similar manner the following 3-oxo-4-bromo-5β-pregnanes were prepared:

4ξ - bromo - 11β,21 - dihydroxy - 16α - methyl - 17α-ethyl-5β-pregnan-3,20-dione 21-acetate.

4ξ - bromo - 11β,21 - dihydroxy - 16α - ethyl - 17α-methyl-5β-pregnan-3,20-dione 21-acetate.

4ξ - bromo - 16α,17α - dimethyl - 21 - hydroxy - 5β-pregnane-3,11,20-trione 21-acetate.

Example 22

Lithium bromide (18 g.) and lithium carbonate (18 g.) were added to dimethylformamide (200 cc.) and the stirred mixture was heated to 95° C. under an atmosphere of nitrogen. 4ξ - bromo - 11β,21 - dihydroxy - 16α,17α-dimethyl - 5β - pregnan - 3,20 - dione 21-acetate (18 g.) was added over 5–10 minutes, and the mixture was maintained under nitrogen at 95° for 5 hours with stirring. The mixture was then poured into a mixture of water (1.25 l.), ice (500 g.) and acetic acid (35 cc.) and agitated for some time after which the solid was filtered and the precipitate washed neutral and free from organic material with water. The dried crude product was crystallized from alcohol/methylene chloride to give 11β,21 - dihydroxy - 16α,17α-dimethyl - $\Delta^4$ - pregnene - 3,20 - dione 21 - acetate (10.4 g.).

The free 21-hydroxy compound was prepared by treating a solution of the 21-acetate in methanol with 1.1 molar equivalents of sodium hydroxide at 5–10° in an atmosphere of nitrogen.

A variety of 21-esters were prepared from the 21-hydroxy compound by reaction using known procedures with the appropriate acylating agent. These included the formate, propionate, isobutyrate, hexaoate, phenylpropionate, pivalate, isovalerate, decanoate and hemisuccinate.

Reaction of the free hydroxy compound with pyridine sulphur trioxide complex gave the pyridinium salt of the 21-hemisulphate ester. This was readily converted by reaction with the appropriate inorganic salt to the sodium, potassium and calcium salts of the 21-hemisulphate ester.

In a similar manner, the following compounds were prepared and hydrolyzed to the corresponding free 21-hydroxy compounds which were then converted to the same 21-esters:

16α,17α - dimethyl - 21 - hydroxy - $\Delta^4$ - pregnene - 3,11, 20-trione acetate.

11β,21 - dihydroxy - 16α - methyl - 17α - ethyl - $\Delta^4$-pregnene-3,20-dione 21-acetate.

11β,21 - dihydroxy - 16α - ethyl - 17α - methyl - $\Delta^4$-pregnene-3,20-dione 21-acetate.

Example 23

A solution of 3β,11β - dihydroxy - 16α,17α - dimethyl-$\Delta^5$ - pregnen - 20 - one (11 g.) in isopropyl alcohol (600 cc.) was treated with m. chloroperbenzoic acid (13.5 g.) and the solution was allowed to stand at 18° C. for 30 hours. Sodium bisulphite was added to destroy excess peracid and then a slight excess of sodium bicarbonate was added, followed by excess water. The solid was filtered, washed thoroughly with water and dried in vacuo to give after one crystallization from aqueous methanol 3β,11β - dihydroxy - 5α,6α - epoxy - 16α,17α - dimethyl-5α-pregnan-20-one (6.5 g.).

Example 24

Anhydrous hydrogen fluoride (20 g.) was passed into a solution of 3β,11β - dihydroxy - 5α,6α - oxido - 16α,17α-dimethyl - 5α - pregnan - 20 - one (8.9 g.) in methylene chloride (150 cc.) while the temperature was maintained at 0–4° C. The mixture was stirred vigorously for two hours and then slowly added to a stirred solution of potassium carbonate (85 g.) in ice water and stirring was continued for 15 minutes. The aqueous phase was made pH 6 by addition of 50% acetic acid and the mixture was then distilled under vaccum to remove the methylene chlorine. The solid which formed was filtered, washed and dried, and purified by swirling with a little chloroform to give 3β,5α,11β - trihydroxy - 6β - fluoro - 16α,17α - dimethyl-5α-pregnan-20-one (5.2 g.).

Example 25

A solution of 3β,11β - dihydroxy - 5α,6α - oxido - 16α, 17α - dimethyl - 5α - pregnan - 20 - one (0.96 g.) in benzene (50 cc.) was added to a solution of methyl magnesium bromide (prepared from 0.7 g. of magnesium) in ether and the ether was allowed to distill until the boiling point reached 78–80° C., and the mixture was then heated under reflux for a total of 3 hours. The reaction mixture was then poured into ice containing hydrochloride acid and the product was isolated via methylene chloride and crystallized from acetone/diisopropyl ether to give 3β,5α, 11β - trihydroxy - 6β,16α,17α - trimethyl - 5α - pregnan-20-one (0.65 g.).

Example 26

5α,11β,21 - trihydroxy - 6β - fluoro - 16α,17α - dimethyl - 5α - pregnane - 3,20 - dione 21 - acetate (2 g.) was heated under reflux for 1.5 hours in acetic acid (50 cc.) and the product, a mixture of the $\Delta^4$-6α and 6β-fluoro compounds was isolated by addition of water. The crude dried product was dissolved in 1% KOH in methanol (40 cc.) and allowed to stand at 15–20° C. for 2 hours in an atmosphere of nitrogen. The solution was then neutralized with acetic acid and concentrated under reduced pressure to give 6α - fluoro - 11β,21 - dihydroxy - 16α,17α-dimethyl-$\Delta^4$-pregnene-3,20-dione (1.1 g.).

In a similar manner 6α,16α,17α - trimethyl - 11β,21-dihydroxy - $\Delta^4$ - pregnene - 3,20 - dione and its 21-esters were also prepared.

Example 27

A solution of 5α,11β,21-trihydroxy-6β-fluoro-16α,17α-dimethyl-5α-pregnane-3,20-dione (1.5 g.) was heated under reflux for 4 hours with 0.75% concentrated HCl in ethanol (75 cc.), and the cooled solution was diluted with water to give a solid which was filtered, washed neutral and dried. Crystalliaztion from acetone/hexane gave 6α-fluoro - 16α,17α-dimethyl - 21 - hydroxy-$\Delta^{4,9(11)}$-pregnadiene-3,20-dione (0.98 g.). Acetylation with acetic anhydride in pyridine gave the 21-acetate.

In a similar manner 6α,16α,17α-trimethyl-21-hydroxy-$\Delta^{4,9(11)}$-pregnadiene-3,20-dione and its 21-acetate were prepared.

Example 28

A solution of 6α-fluoro-16α,17α-dimethyl-21-hydroxy-$\Delta^{4,9(11)}$-pregnadiene-3,20-dione 21-acetate (4 g.) and dichlorodicyanobenzoquinone (3.7 g.) in benzene (80 cc.) was heated under reflux for 24 hours. The mixture was filtered and the filtrate was concentrated and run through a short column of alumina and washed through with more benzene. The combined eluate were evaporated to dryness under reduced pressure and crystallized from acetone/hexane to give 6α-fluoro - 16α,17α - dimethyl-21-hydroxy-$\Delta^{1,4,9(11)}$-pregnatriene-3,20-dione acetate (2.9 g.).

In a similar manner 6α,16α,17α-trimethyl-21-hydroxy-$\Delta^{1,4,9(11)}$-pregnatriene-3,20-dione acetate was prepared.

Example 29

A solution of 9α-fluoro-11β,21-dihydroxy-16α,17α-dimethyl - $\Delta^4$ - pregnene-3,20-dione 21-acetate (0.9 g.) and chloranil (1.0 g.) in t-butyl alcohol (30 cc.) was heated under reflux for 4 hours and then concentrated under reduced pressure. The residue was dissolved in methylene chloride, filtered, and the solution washed with 0.5 N sodium hydroxide solution and then with water to neutrality. The solution was concentrated and passed down a short column of alumina and washed through with methylene chloride. The eluate and washings were evaporated to dryness and the residue crystallized from acetone/hexane to give 9α-fluoro - 11β,21 - dihydroxy-16α,17α-dimethyl-$\Delta^{4,6}$-pregnadiene-3,20-dione 21-acetate (0.3 g.).

Hydrolysis with 1.1 molar equivalents of sodium hydroxide in methanol in an atmosphere of nitrogen gave the free 21-hydroxy compound.

In a similar manner the following compounds were prepared:

6,9α-difluoro - 11β,21 - dihydroxy-16α,17α-dimethyl-$\Delta^{4,6}$-pregnadiene-3,20-dione and its 21 acetate.

6,16α,17α - trimethyl-9α-fluoro - 11β,21 - dihydroxy-$\Delta^{4,6}$-pregnadiene-3,20-dione and its 21-acetate.

Example 30

A solution of 9α-fluoro - 11β,21 - dihydroxy-16α,17α-dimethyl-$\Delta^{4,6}$-pregnadiene-3,20-dione 21-acetate (0.5 g.) and dichlorodicyanobenzoquinone (0.45 g.) in benzene (20 cc.) was heated under reflux for 15 hours, cooled and filtered. The filtrate was passed down a column of alumina and washed through with more benzene. The combined eluates were evaporated to dryness and the residue crystallized from acetone/cyclohexane to give 9α-fluoro-11β, 21 - dihydroxy - 16α,17α - dimethyl - $\Delta^{1,4,6}$ - pregnatriene-3,20-dione 21-acetate (0.18 g.).

Hydrolysis with 1.1 molar equivalents of sodium hydroxide in methanol under nitrogen gave the free 21-hydroxy compound.

The following compounds were prepared in a similar manner:

6,9α-difluoro - 11β,21 - dihydroxy - 16α,17α - dimethyl-$\Delta^{1,4,6}$-pregnatriene-3,20-dione and its 21 acetate.

6,16α,17α - trimethyl - 9α - fluoro-11β,21-dihydroxy-$\Delta^{1,4,6}$-pregnatriene-3,20-dione and its acetate.

Example 31

A variety of monoesters of 9α-fluoro-11β,21-dihydroxy-16α,17α-dimethyl - $\Delta^{1,4}$ - pregnadiene - 3,20 - dione described in Example 6 were prepared according to known procedures by reacting the free hydroxy compound with the appropriate acylating agent. These include such esters as the formate, acetate, propionate, isobutyrate, pivalate, hexanoate, isovalerate, decanoate, palmitate, phenylpropionate and hemisuccinate.

Reaction with pyridine sulphur trioxide complex in pyridine gave the pyridinium salt of the hemisulphate ester which, by interaction with the appropriate metal salt, was converted into the sodium, potassium and calcium salts of the hemisulphate ester.

In the same manner the 21-esters of the following compounds were prepared:

6α,16α,17α - trimethyl - 9α - fluoro-11β,21-dihydroxy-$\Delta^{1,4}$-pregnadiene-3,20-dione.

6α,9α-difluoro - 11β,21 - dihydroxy-16α,17α-dimethyl-$\Delta^{1,4}$-pregnadiene-3,20-dione.

9α-fluoro - 11β,21 - dihydroxy - 16α,17α - dimethyl-$\Delta^4$-pregnen-3,20-dione.

6α - fluoro - 11β,21 - dihydroxy-16α,17α-dimethyl-$\Delta^4$-pregnene-3,20-dione.

6α,9α - difluoro - 11β,21 - dihydroxy-16α,17α-dimethyl-$\Delta^4$-pregnene-3,20-dione.

6α,16α,17α-trimethyl - 11β,21 - dihydroxy-$\Delta^4$-pregnene-3,20-dione.

6α,16α,17α - trimethyl - 9α - fluoro-11β,21-dihydroxy-$\Delta^4$-pregnene-3,20-dione.

6α,fluoro - 11β,21 - dihydroxy-16α,17α-dimethyl-$\Delta^{1,4}$-pregnene-3,20-dione.

6α,16α,17α - trimethyl - 9α - fluoro - 11β,21 - dihydroxy-$\Delta^{1,4}$-pregnadiene-3,20-dione.

6α,16α,17α - trimethyl - 11β,21 - dihydroxy - $\Delta^{1,4}$-pregnene-3,20-dione.

9α - fluoro - 11β,21 - dihydroxy-16α,17α-dimethyl-$\Delta^{4,6}$-pregnene-3,20-dione.

6,9α-difluoro-11β,21 - dihydroxy - 16α,17α - dimethyl-$\Delta^{4,6}$-pregnadiene-3,20-dione.

6,16α,17α-trimethyl - 9α - fluoro - 11β,21 - dihydroxy-$\Delta^{4,6}$-pregnadiene-3,20-dione.

9α-fluoro-11β,21 - dihydroxy - 16α,17α-dimethyl-$\Delta^{1,4,6}$-pregnatriene-3,20-dione.

6,9α-difluoro - 11β,21 - dihydroxy - 16α,17α - dimethyl-$\Delta^{1,4,6}$-pregnatriene-3,20-dione.

6,16α,17α - trimethyl - 9α - fluoro - 11β,21-dihydroxy-$\Delta^{1,4,6}$-triene-3,20-dione.

9α-fluoro - 11β,21 - dihydroxy - 16α - methyl-17α-ethyl-$\Delta^{1,4}$-pregnadiene-3,20-dione.

9α - fluoro - 11β,21 - dihydroxy - 16α-ethyl-17α-methyl-$\Delta^{1,4}$-pregnadiene-3,20-dione.

What is claimed is:

1. Process for the introduction of a 17α-alkyl substituent into a 20-keto-steroid of the pregnane series comprising reacting a $\Delta^{17(20)}$-20-Grignard enolate of a 20-keto-steroid of the pregnane series with a compound of the formula:

R—X wherein R is a saturated aliphatic hydrocarbon group, having 1–4 carbon atoms, and X is a halogen atom.

2. Process according to claim 1 in which the starting product is the 20-Grignard enolate of the corresponding 16α-alkyl-$\Delta^{17(20)}$-20-hydroxy compound.

3. Process according to claim 1 in which the reaction takes place in an aprotic solvent with a low dielectric constant.

4. Novel pregnane compounds of the formula:

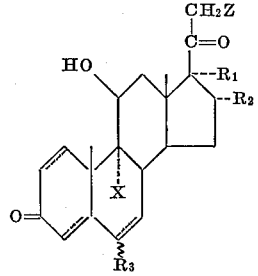

in which

R₁ is a saturated aliphatic hydrocarbon group having 1–4 carbon atoms,

R₂ is selected from the group consisting of hydrogen and a saturated aliphatic hydrocarbon radical having 1–4 carbon atoms, R₃ is selected from the group consisting of hydrogen, a methyl group and halogen;

X is selected from the group consisting of hydrogen and fluorine;

Z is selected from the group consisting of H, OH and OAcyl; and $C_1$–$C_2$ and $C_6$–$C_7$ are selected from the group consisting of a saturated and an unsaturated bond.

5. Novel pregnane compounds of the formula:

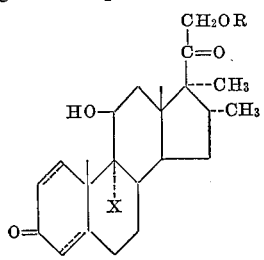

wherein
$C_1$–$C_2$ is selected from the group consisting of a saturated and an unsaturated bond;

X is selected from the group consisting of hydrogen and fluorine; and

R is selected from the group consisting of hydrogen and acyl derived from a member selected from the group consisting of an inorganic acid and an organic carboxylic acid having from 1 to 18 carbon atoms.

References Cited

UNITED STATES PATENTS 3,232,839  2/1966  Kuslich et al. _____ 167—77

OTHER REFERENCES

Engel et al.: Can. J. Chem., vol. 39, No. 9, 1961.

ELBERT L. ROBERTS, Primary Examiner

UNITED STATES PATENT OFFICE
CERTIFICATE OF CORRECTION

Patent No. 3,520,908    Dated July 21, 1970

Inventor(s) COLIN LESLIE HEWETT ET AL.

It is certified that error appears in the above-identified patent and that said Letters Patent are hereby corrected as shown below:

Claim 4, change the structural formula to read:

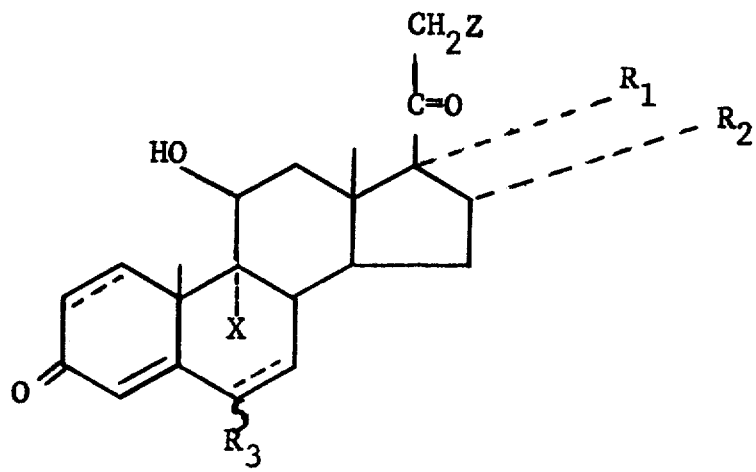

Claim 5, change the structural formula to read:

SIGNED AND SEALED
OCT 20 1970

(SEAL)
Attest:

Edward M. Fletcher, Jr.
Attesting Officer

WILLIAM E. SCHUYLER, JR.
Commissioner of Patents